(12) United States Patent
Lénérand et al.

(10) Patent No.: US 6,679,056 B2
(45) Date of Patent: Jan. 20, 2004

(54) PRESSURE BOOSTER

(75) Inventors: Lucien Lénérand, Kongsberg (NO); Sven Bjørkgård, Kongsberg (NO)

(73) Assignee: Kongsberg Automotive ASA, Kongsberg (NO)

(*) Notice: Subject to any disclaimer, the term of this patent is extended or adjusted under 35 U.S.C. 154(b) by 8 days.

(21) Appl. No.: 10/169,166

(22) PCT Filed: Dec. 21, 2000

(86) PCT No.: PCT/NO00/00443
§ 371 (c)(1),
(2), (4) Date: Jun. 28, 2002

(87) PCT Pub. No.: WO01/50033
PCT Pub. Date: Jul. 12, 2001

(65) Prior Publication Data
US 2003/0056509 A1 Mar. 27, 2003

(30) Foreign Application Priority Data
Dec. 29, 1999 (NO) .................................. 996559

(51) Int. Cl.$^7$ .............................................. B60T 13/20
(52) U.S. Cl. ........................................... 60/557; 60/575
(58) Field of Search .................... 60/556, 557, 558, 60/563, 575

(56) References Cited

U.S. PATENT DOCUMENTS 2,365,471 A * 12/1944 Ingres ........................ 60/556
3,754,395 A * 8/1973 Mochizuki et al. ........... 60/575
5,934,075 A 8/1999 Castel et al. ................. 60/552
5,991,681 A 11/1999 Bill et al. ..................... 701/70

FOREIGN PATENT DOCUMENTS

DE 195 09 356 A1 9/1996

OTHER PUBLICATIONS

GRAU GmbH, "Hydrair", Einbauhinweise, pp. 1–6, Jul. 1995.

* cited by examiner

Primary Examiner—Edward K. Look
Assistant Examiner—Michael Leslie
(74) Attorney, Agent, or Firm—Finnegan, Henderson, Farabow, Garrett & Dunner, L.L.P.

(57) ABSTRACT

A pressure booster comprising a housing (11) with a low-pressure fluid inlet (14), a high-pressure fluid outlet (15), and an inlet (16) and an outlet (17) for compressed air. In the housing (11) there is provided a main piston (22) with an enlarged portion (23), which together with the housing (11) define a third cylinder space (26), which can be connected to the compressed air inlet (16). Furthermore, the main piston (22) has a small end portion (22b) which together with the housing define a second cylinder space (27) and whereby fluid at increased pressure can be moved out of the housing (11) via a high-pressure fluid outlet (15) when the third cylinder space (26) is supplied with compressed air. In an axial passage (29) there is mounted a check valve (30), which can be influenced by a body.

5 Claims, 4 Drawing Sheets

PRESSURE BOOSTER

The invention relates to a pressure booster for increasing the pressure of a hydraulic fluid by means of a pressure gas, as indicated in the introduction of claim 1.

A booster of this type can be found on the market, where the check valve is operated by an end portion of a rod which extends through the main piston from near an end portion thereof which is influenced by low-pressure fluid where the rod is arranged to abut against a portion of the housing. The shut-off valve comprises a valve piston which is slidably mounted in the housing and which is influenced by the low-pressure fluid at the same time as the main piston is influenced by this pressure. The shut-off valve can thereby be opened and compressed air is supplied to the third cylinder space, thus causing the main piston to be moved and the pressure in the fluid in the second cylinder space increased before the check valve has been moved to its second position. The result of this is that a high-pressure impulse generated by depressing the clutch pedal can be transmitted from the booster to the clutch master cylinder causing a return movement of the master cylinder's piston and thereby the clutch pedal, which is undesirable.

The main piston must therefore be moved some distance in order to close the check valve after the shut-off valve has been opened. Only after this closure can the pressure in the high-pressure fluid be increased to the desired value. This is disadvantageous if the booster is employed in connection with an operating device for clutches, where the distance which is available for movement of a clutch pedal is limited.

The characteristics of the booster according to the invention are set forth in the characterising features indicated in the claims.

The invention will now be described in more detail with reference to the drawing. The terms left and right should be understood as indications of position and direction with reference to the figures as they are viewed by the reader.

Figure 1:
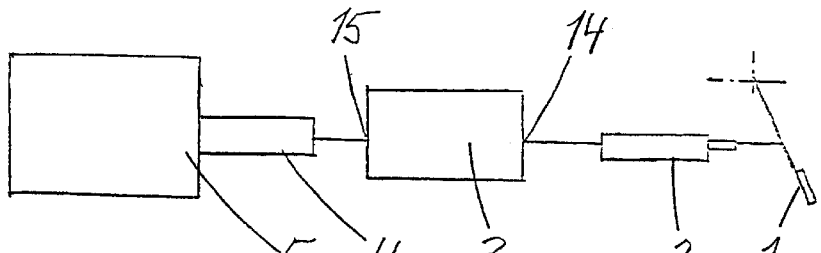
FIG. 1 is a schematic view illustrating the interconnection of components of an operating device for clutches.

As illustrated in FIG. 1, an operating device for a clutch may comprise a clutch pedal 1 which is connected to a hydraulic master cylinder 2. This is arranged to supply a hydraulic fluid at relatively low pressure to a low-pressure inlet 14 of a booster 3 which in turn is arranged to deliver a hydraulic fluid at an increased pressure to a slave cylinder 4 via a high-pressure outlet 15. The slave cylinder 4 is arranged to operate a clutch 5.

Figure 2:
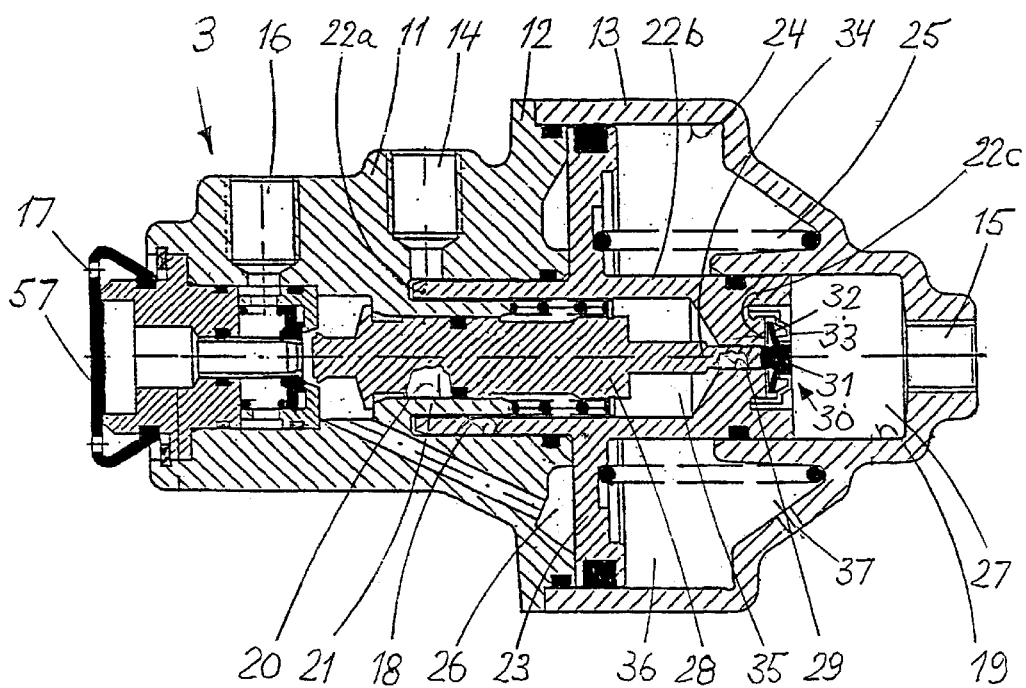
FIGS. 2–5 are longitudinal sections through a first embodiment of a booster according to the invention, where the views illustrate respective, different relative positions of components of the booster.

As illustrated in FIG. 2, the booster 3 comprises a housing 11 with a first housing part 12 and a second housing part 13. In the first housing part 12 there is provided a low-pressure inlet 14 which communicates with the clutch master cylinder 2 and a high-pressure outlet 15 which communicates with the slave cylinder 4. Furthermore, in the first housing part 12 there is provided a compressed air inlet 16, which communicates with a compressed air source (not illustrated), and in connection with the first housing part 12, openings or outlets 17 are provided for such air after it has carried out work.

In the first and second housing parts 12, 13 there extends a first bore 18 and a second bore 19 respectively, the second bore 19 being coaxial with the first bore 18. The diameters of these bores need not be the same. Moreover, in the first housing part 12, radially inside the first bore 18, there is provided a third bore 20, with the result that between the first and the third bore 18 and 20 respectively, a skirt 21 is formed.

In the first and second bores 18, 19, there are slidably and sealingly arranged a first and a second end portion 22a, 22b respectively of an external piston or main piston 22 which between the first and the second end portions has a central portion 23 with a larger diameter than the diameter of these end portions 22a, 22b, where this central portion 23 can slide sealingly in a fourth bore 24 of the second housing part 13. A first return spring 25 is arranged to force the main piston 22 towards the left in FIGS. 2–6.

Left-facing main piston end portion surfaces and the first housing part 12 define a first cylinder space 35.

The second end portion 22b of the main piston 22 and the second housing part 13 define a second cylinder space 27.

Left-facing central portion surfaces and the housing 11 define a third cylinder space 26.

Right-facing central portion surfaces and the second housing part 13 define a cylinder space 36 which communicates with the open air outside the booster via an opening 37 in the second housing part 13.

In the third bore 20 there is sealing and slidably mounted an internal piston or valve piston 28.

In the second, right-hand end portion 22b of the main piston 22 there extends an axial, central, first passage 29 wherein there is inserted with clearance a plug 30 with a thickened central portion 31 which can be moved in the passage's longitudinal direction. From the plug's central portion there extends radially outwards an elastic flange portion 32, whose peripheral portion forms a sealing lip. An elastic, annular cover or clamp 33, whose outer peripheral portion is attached to the main piston 22, abuts with the portion which is located near the cover's central annular opening against the flange portion 32 and attempts to move the plug 30 to the left, thereby bringing the flange portion's sealing lip into sealing abutment against a right-facing end surface 22c of the main piston 22. The cover 33 has a number of holes which provide a connection between the second cylinder space 27 and the space which is defined by the flange portion 32 and the cover 33.

The valve piston 28 has a right-hand end portion 34 with a pin portion 34a which can be inserted with clearance into the fifth bore 29. When the valve piston 28 is moved to the right, its pin portion 34a may abut against the plug 30, pushing it to the right, against the elastic spring force of the cover 33, with the result that the plug's flange portion 32 does not abut against the right-hand end surface of the main piston 22. A connection is thereby provided between the second cylinder space 27 and the first cylinder space 35 via the first passage 29, an annular opening between the end surface 22c and the sealing lip of the flange portion 32 and the holes in the cover 33.

When the right-hand end portion 34 of the valve piston 28 does not abut with the plug 30, the plug's flange portion 32 forms a check valve, which permits fluid to flow from the first cylinder space 35 to the second cylinder space 27, where the flange portion 32 can be elastically deformed to the right and away from its contact surface 22c of the main piston 22. On the other hand, no fluid flow is permitted in the other direction from the second cylinder space 27 to the first cylinder space 35.

As illustrated by reference numerals in FIG. 3, a stop or spring ring 40 is mounted on the valve piston 28 near its central portion. The skirt 21 has a right-hand end portion 41 and between this end portion 41 and the spring ring 40 there is mounted a second return spring 42, which is in the form of a helical spring which surrounds the valve piston 28 and attempts to push it to the right. At the left-hand end portion of the valve piston 28 there is a flange 43 which is arranged to abut against a shoulder 44 at the left-hand end of the skirt 21, thereby restricting the stroke of the valve piston 28 to the right.

When the valve piston 28 is influenced only by the second return spring 42, the flange 43 comes into abutment against the shoulder 44, whereby the pin portion 34a of the valve piston 28 comes into abutment against the plug 30, thus causing its lip portion to be slightly removed from its contact surface 22c. A fluid flow is thereby permitted in both directions past the plug 30 through the first passage 29.

Figure 4:
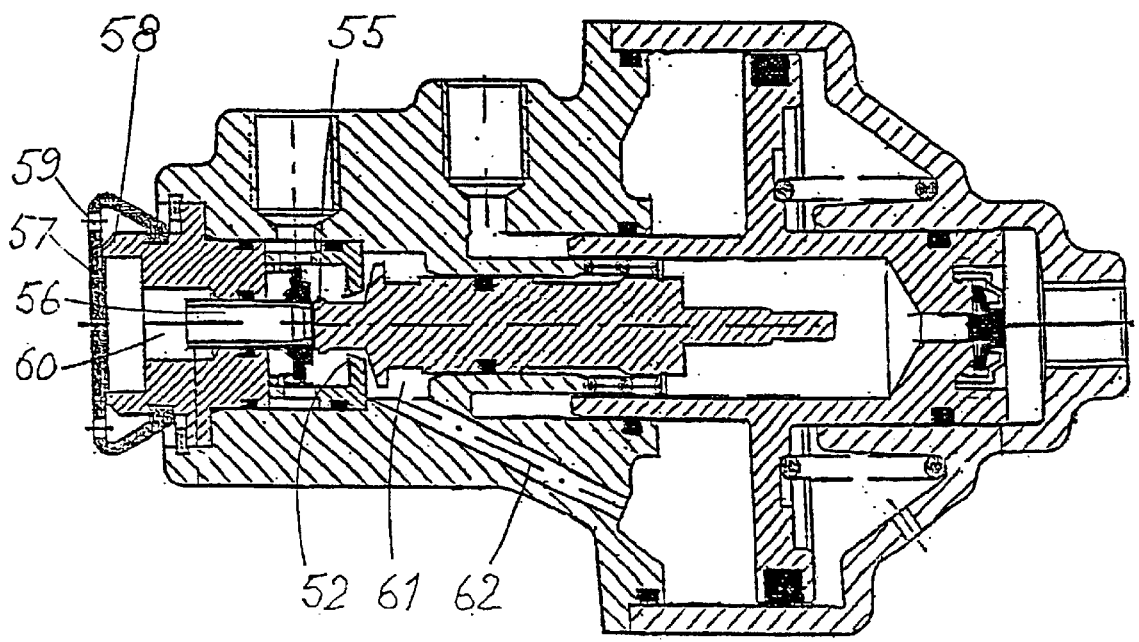

In the left-hand end portion of the first housing part 12 an axial fifth bore 45 is provided therein, wherein there is sealingly attached a substantially cylindrical valve housing 46. In this valve housing 46 there is provided an axial, sixth bore 47, wherein there is sealingly and slidably mounted a valve body 48 with a valve stem 49 and a valve plate 50. The valve plate 50 is mounted round the right-hand end of the valve stem 49. As also illustrated in FIG. 4, through the valve body 48 there is provided an axial through-going second passage 56.

At a central portion of the valve housing 46 there is provided therein a cylindrical valve space 51 through which the valve plate 50 can be moved axially with clearance. The valve space 51 is bounded at its right-hand end by a right-hand wall portion 54 of the valve housing 46, a seat 52 (see also FIG. 4) being provided for the valve plate 50 along the periphery of an opening through this right-hand wall portion 54. A third return spring 53 is mounted in the valve space 51 round the valve stem 49 and between a portion of the valve housing 46 and the valve plate 50, which spring attempts to move the valve body 48 to the right to abut against the seat 52. The valve space 51 constantly communicates with the compressed air inlet 16 via an opening in the valve housing 46.

A left-hand end 55 of the valve piston 28 is arranged to come into abutment against the right-hand end of the valve body 48, thereby sealing the second passage 56 there.

The wall portion 54, the first housing part 12 and the valve piston 28 define a fourth cylinder space 61 which constantly communicates with the third cylinder space 26 via a channel or third passage 62 which is formed in the first housing part 12.

Figure 5:
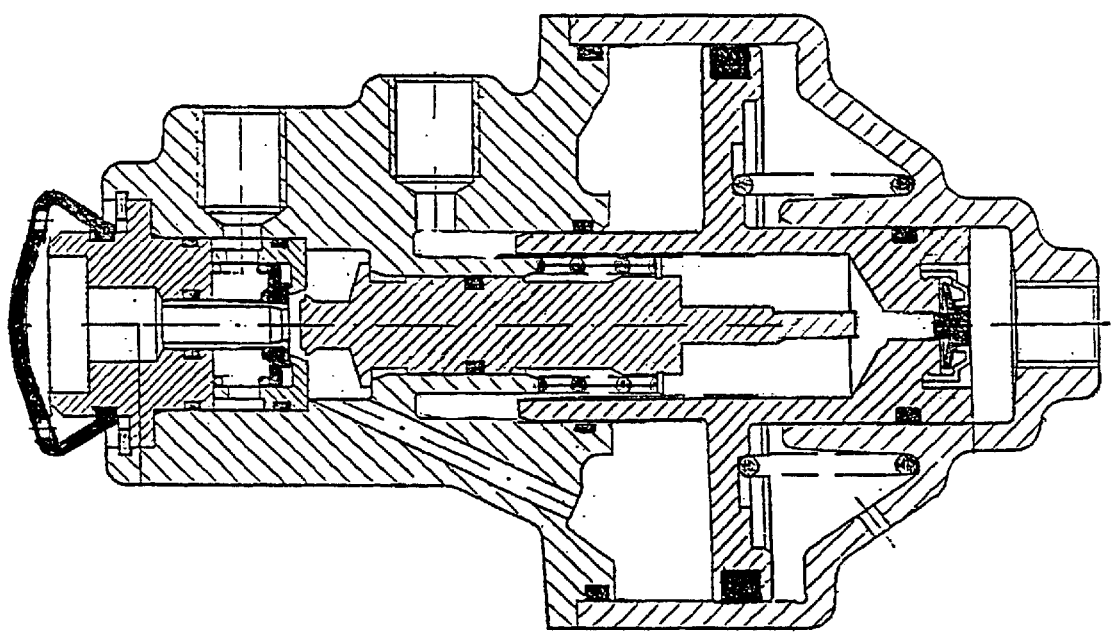

At the left-hand end of the valve housing 46 an elastic hood 57 is mounted, which on account of its inherent elasticity attempts to come into sealing abutment against a left-hand, circular end or seat 58 of the valve housing 46, closing an end space 60, which forms an extension of the sixth bore 47. In the portion of the hood 57 which is located radially outside the seat 58, a hole 59 is provided which forms an outlet for compressed air which is flowing from the third cylinder space 26 and which has delivered its energy to the main piston. If the pressure of the air which is located in the end space 60 is greater than the pressure of the air surrounding the booster 10, the hood's central portion may be deformed convexly to the left, with the result that it no longer abuts against its seat 58, as illustrated in FIG. 5. The space outside the housing 11 can thereby communicate with the end space 60 via the holes 59 and a passage between the seat 58 and the hood 57.

The function of the booster will be explained in more detail below, where it should be understood that the inlet 16 is connected to a compressed air source (not shown) and the booster's components initially have the relative position illustrated in FIG. 2.

The booster 3 is now located in a rest position, wherein the clutch pedal 1 is not being operated and the clutch 5 is engaged. The valve piston 28 is hereby located in a position wherein its flange 43 abuts against the shoulder 44 and hydraulic fluid can flow in both directions past the flange portion 32 of the plug 30. The valve plate 50 abuts against the seat 52, preventing a communication between the third cylinder space 26 and the compressed air inlet 16. Moreover, the slave cylinder 3 communicates with the master cylinder 2 via the first cylinder space 35, the annulus between the main piston 22 and the skirt 21 and the low-pressure inlet 14.

The formation of a disadvantageous, raised pressure in the hydraulic line between the slave cylinder 4 and the booster 10, e.g. on account of a temperature increase is thereby prevented. Similarly, any leakage of hydraulic fluid near the slave cylinder can be compensated for by supplying hydraulic fluid from a fluid reservoir (not illustrated) which is connected to the master cylinder.

When the clutch requires to be released, the pedal 1 is moved whereby the pressure of the hydraulic fluid at the low-pressure inlet 14 increases. This pressure propagates to the right to the first cylinder space 35 via the annular opening between the main piston 22 and the skirt 21. The raised pressure exerts a force against the right-hand end surface of the valve piston 28, moving it initially a short distance to the left to the position illustrated in FIG. 3, while compressing the second return spring 42.

The right-hand end portion 34 of the valve piston 28 is thereby moved away from the plug 30, thus enabling the flange portion 32 together with its seat now to act as a check valve. Hydraulic fluid can thereby no longer flow from the slave cylinder 4 to the low-pressure inlet 14.

Figure 3:
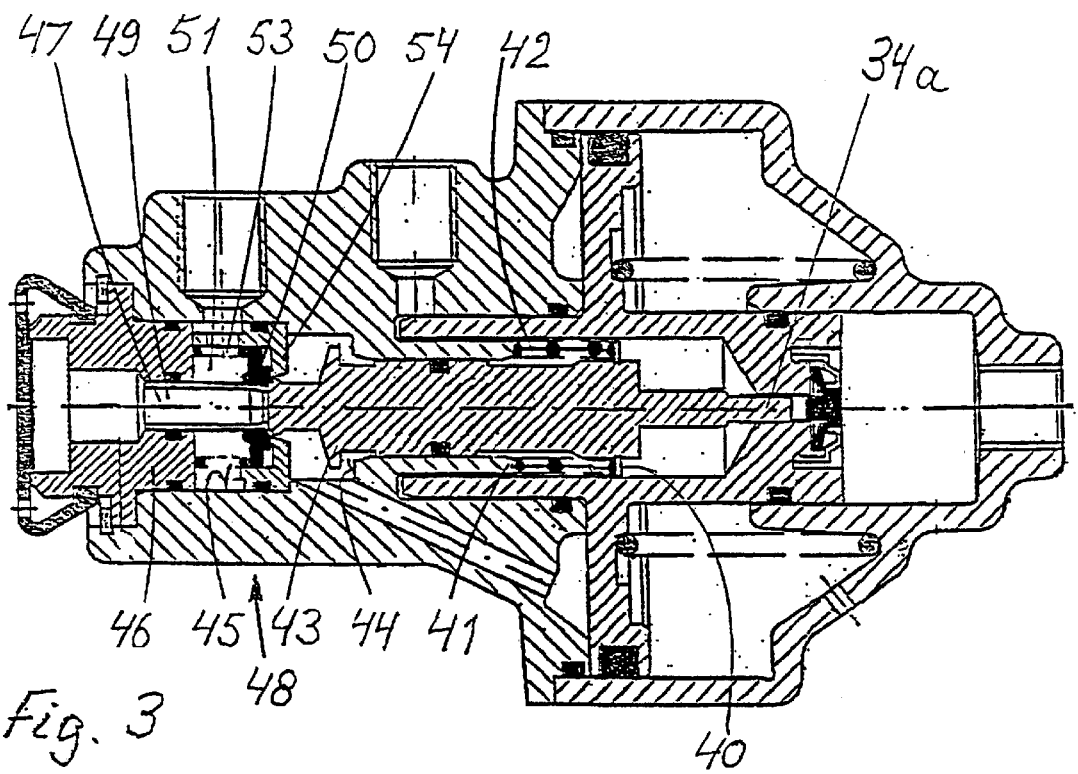

As illustrated in FIG. 3, the valve piston 28 has now come into abutment against the right-hand end of the valve body 48, sealing the second passage 56 through it. Air from the fourth cylinder space 61 is thereby unable to flow out into the space outside the booster 10 via the holes in the hood 57.

A further movement of the clutch pedal causes the pressure to increase further and the valve piston causes the valve plate to move away from the seat 52, as illustrated in FIG. 4. Compressed air can thereby flow from the compressed air inlet 16, past the valve 48 to the third cylinder space 26 via the channel 62, pushing the main piston 22 to the right. The pressure of the fluid located in the second cylinder space 27 is thereby greatly increased and this pressure influences the slave cylinder for disengagement of the clutch.

The increased pressure in the hydraulic fluid in the second cylinder space 27 is greater than the pressure in the hydraulic fluid in the low-pressure inlet 14.

When the clutch pedal is moved back, the pressure of the fluid in the low-pressure inlet 14 and in the first cylinder space 35 is reduced. The valve piston 28 is thereby moved to the right under the influence of the second return spring 42, whereby the first valve plate 50 comes into abutment against its seat 52, with the result that the third cylinder space 26 no longer communicates with the compressed air inlet 16, see FIG. 3.

A further movement of the valve piston 28 to the right causes its flange 43 to come into abutment against the shoulder 44. At the same time the second passage 56 through the valve stem 49 is opened and communication is obtained between the third cylinder space 26 and the end space 60 via the channel or third passage 62 and an opening between the right-hand end wall 54 of the valve housing 46 and the left-hand end of the valve piston 28. The high air pressure in the third cylinder space 26 then propagates to the end space 60, thus causing the hood 57 to be removed from its seat 58, and providing a communication between the third cylinder space 26 and the space outside the booster 10, see FIG. 5. The pressure in the third cylinder space 26 is thereby reduced. The main piston 22 will therefore now be moved to the left under the influence of the force of a return spring (not illustrated) of the clutch, this return spring causing the clutch to return to a position wherein it is engaged and the slave cylinder piston to return to a corresponding position.

When the main piston 22 has been moved a maximum distance to the left in the second housing part 13, the pin end 34a of the valve piston 28 comes into abutment against the plug 30, thus once again providing communication between the slave cylinder 4 and the inlet opening 14 and thereby the fluid reservoir. This final position thus corresponds to that illustrated in FIG. 2.

In the figures the pistons' movements are illustrated in enlarged form for the sake of clarity. It will be understood that a movement of the valve piston for opening the air valve body 48 may occur simultaneously with a removal of the valve piston from the plug 30, and that this movement may be small.

By means of the invention a sequential movement of the valve piston and the main piston are obtained, thus preventing back-pressure which may lead to the above-mentioned propagation of a fluid pressure impulse from the second cylinder space 27 to the master cylinder 2 immediately after the clutch pedal has been depressed for releasing the clutch, and thereby an undesirable movement of the pedal in the opposite direction. The object is also achieved that the main piston remains at rest until the check valve has been closed, thus enabling the entire main piston movement to be used for movement of, e.g., a clutch slave cylinder.

Even though it was stated above that the booster may be supplied with compressed air and a hydraulic fluid, it will be understood that any fluid whatever may be used instead.

Figure 6:
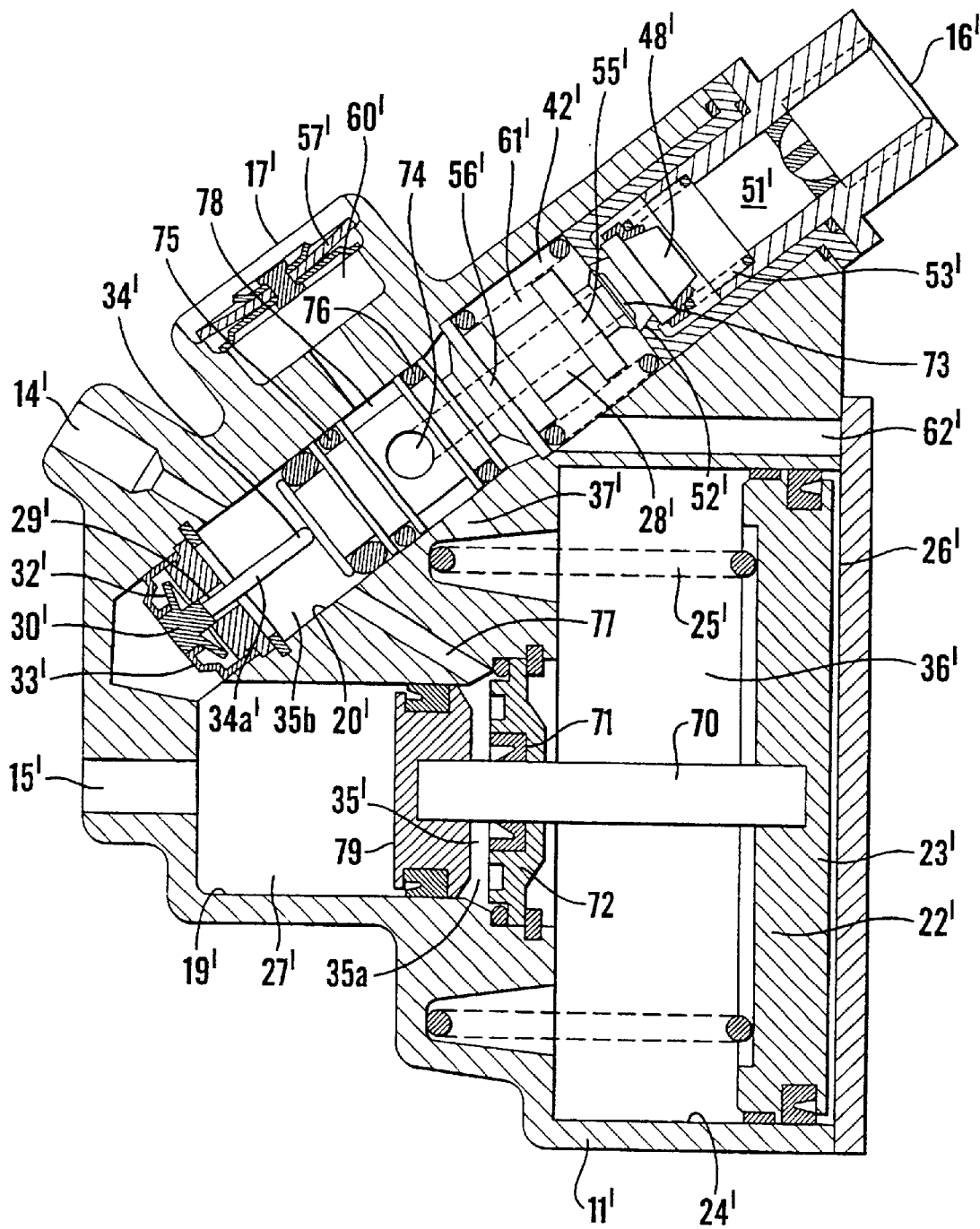
FIG. 6 is a longitudinal section through a second embodiment of a booster according to the invention.

FIG. 6 shows a longitudinal section through a second embodiment of a pressure booster according to the invention. This second booster resembles the first booster illustrated in FIGS. 2–6, but the valve piston is not mounted coaxially relative to the main piston. Moreover, this second booster is viewed from the opposite side, with the result that corresponding portions which in the first booster are facing right, are facing left in the second booster. Components in the second booster which correspond to components of the first booster as far as function is concerned are designated by the same reference numerals with the addition of an apostrophe.

As illustrated in FIG. 6 the second embodiment of the booster comprises a housing 11'. In the housing 11' there is provided a bore 20' for a valve piston 28' and bores 19' and 24' for a main piston 22'.

At one end the main piston 22' has a large portion 23' which is arranged to slide sealingly in the bore 24' and a small second end portion 79 which is arranged to slide sealingly in the bore 19'. These portions 23' and 79 are interconnected by a rod 70 which is arranged to slide sealingly through a seal 71 in a wall 72 of the housing 11'.

The valve piston 28' has a first end portion or pin portion 34a' which, when this piston is moved in one direction, is arranged to engage with a plug 30' which acts as a check valve. This engagement permits an unimpeded flow in both directions past the plug 30'.

A second end portion 55' of the valve piston 28' is arranged to engage with a valve body 48' which by means of a third return spring 53' is arranged to be pressed resiliently against a valve seat 52'.

Through the valve piston there extends a longitudinal passage 56' from a first opening 73 in the valve piston's end surface at the second end portion 55'. This passage 56' leads into a second opening 74 which is provided in a central portion with reduced diameter of the valve piston 28'. Together with the housing 11' the central portion thereby defines an annulus 78 which communicates with the passage 56' via this opening 74. Near the ends of the central portion there are provided at axial intervals respective sealing devices 75, 76, which abut sealingly against the wall of the bore 20' in the valve housing 11', and which define the annulus 78.

The small end portion 79 of the main piston 22' together with the wall portion 72 define a first portion 35a of a first cylinder space 35'.

The first end portion 34a of the valve piston 28' together with the plug 30' and the housing 11' define a second portion 35b of the first cylinder space 35'.

These cylinder space portions 35a and 35b communicate with each other via a channel 77.

In the housing 11' there is provided an opening 14' which is arranged to communicate on one side with the master cylinder 2 and on the other side with the second cylinder space portion 35b.

The small end portion 79 of the main position together with the housing 11' define a second cylinder space 27' which is arranged to communicate with an outlet 15' which in turn is arranged to communicate with the slave cylinder 4.

A first side of the main piston's large portion 23' facing away from the main piston's small end portion 79 together with the housing 11 define a third cylinder space 26'.

The end portion of the valve piston facing away from its central portion defines a fourth cylinder space 61'.

The third and the fourth cylinder spaces 26' and 61' respectively communicate with each other via a third passage 62'.

The second side of the main piston's large portion 23', the housing 11' and the wall portion 72 define a fifth cylinder space 36'. This cylinder space 36' communicates with the annulus via an air channel 37'.

The annulus 78 is connected via a check valve 57' with a compressed air outlet 17' which is provided in the housing 11'.

The mode of operation of the second embodiment of the booster is as follows being based on the relative position of the booster's components illustrated in FIG. 6, where the clutch pedal is not being operated. The end portion 34a' of the valve piston 28' hereby abuts against the plug 30'. Fluid in the slave cylinder can thereby flow out of the low-pressure inlet 14' to a reservoir (not illustrated) for this fluid, with the result that no increase in pressure occurs in the slave cylinder which could destroy it or related components.

When the clutch pedal is depressed in order to release the clutch, hydraulic fluid flows from the master cylinder 2 to the inlet 14' and into the first cylinder space portions 35a and 35b.

The valve piston 28' is thereby moved towards the valve body 48', thereby generating a movement thereof away from its seat 52' while at the same time the plug 30' is released.

A flange portion 32' of the plug 30' can then act as a check valve which permits flow from the first cylinder space portion 35a to the second cylinder space 27', but not in the opposite direction.

On account of the valve piston's abutment against the valve body 48', the channel 56 is closed and compressed air can flow into the third cylinder space 26' via the fourth cylinder space 61' and the channel 62'. The main piston 22' is thereby moved, thus causing the volume of the second cylinder space 27' to be reduced and hydraulic fluid at high pressure to flow into the slave cylinder 4 for releasing the clutch 5. Hydraulic fluid hereby flows from the master cylinder into the first cylinder space 35 as a result of the increase in the volume of its first cylinder space portion 35*a*, which in the usual manner gives the driver of the vehicle a feeling of operating the clutch.

When the clutch pedal is moved in the other direction, the pressure in the first cylinder space 35' is reduced, with the result that the valve piston is moved in the other direction under the influence of the second return spring 42'.

The valve body 48' thereby comes into abutment against its seat 52' and the opening 73 in the adjacent end of the channel 56' is opened, thus permitting compressed air in the third cylinder space 26' to flow out into the surroundings of the housing 11' via the channel 62', the fourth cylinder space 61', the channel 56' and the opening 74. Air from the third cylinder space 26' can hereby also flow into the fifth cylinder space 36', with the result that the pressure of the air here is not reduced and thereby preventing a return movement of the main piston.

The plug 30' has now ceased to act as a check valve.

An advantage of this second embodiment of the booster is that in the fifth cylinder space 36 air is only supplied via the compressed air inlet i.e. purified air from a compressed air source. Furthermore, this embodiment permits the bores etc. in the valve housing to be designed in a simpler manner.

In the above-mentioned description of the housing 11', it has been assumed that components which are fixed to the housing 11' belong to it. It will be appreciated, however, that the housing may include portions which can be disconnected from one another to enable components of the booster to be mounted therein.

It will be understood that the illustrated check valve is only one embodiment, and that it may instead comprise a ball which is pressed by a spring against a seat.

What is claimed is:

1. A booster for increasing the pressure in a hydraulic fluid by means of a pressure gas, such as compressed air, especially for use in connection with an operating device for clutches for vehicles, comprising a housing (11,11') with an inlet (14,14') for low-pressure fluid, an outlet (15,15') for high-pressure fluid, an inlet (16,16') and an outlet (17,17') for compressed air and a main piston (22,22') mounted in the housing (11,11') with an end portion (22*b*,79) with a relatively small diameter and a portion (23,23') with an enlarged diameter, where the small end portion (22*b*, 79) together with the housing (11,11') define a second cylinder space (27,27'), which is connected to the high-pressure fluid outlet (15,15'), and the large portion (23,23') together with the housing (11) define a third cylinder space (26,26'), which can be connected to the compressed air inlet (16,16') or the outlet (17,17'), the third cylinder space (26,26') being located on one side of the main piston (22,22') and the second cylinder space (27,27') located on the other side of the main piston (22,22'), viewed in the main piston's (22) axial direction, and there is provided a first passage (29,29') which connects the second cylinder space (27,27') with the low-pressure fluid inlet (14,14') and in this passage (29) there is provided a check valve (30,30'), which can be influenced by a body (28,28'), which, when no low-pressure fluid impulse exists in the low-pressure fluid inlet (14,14'), influences the check valve (30,30') in such a manner that it is located in a first position, wherein a fluid flow is permitted in both directions through the first passage (29), and which when such an impulse exists, brings the check valve (30) into a second position, wherein it permits a flow only from the low-pressure fluid inlet (14,14') to the second cylinder space (27), and in the housing there is provided a shut-off valve (48,52;48',52') which in a first position prevents a connection between the third cylinder space (26,26') and the compressed air inlet (16,16') and provides a connection between the third cylinder space (26,26') and the compressed air outlet (17,17'), and in a second position provides a connection between the third cylinder space (26,26') and the compressed air inlet (16, 16'), preventing a connection between the third cylinder space (26,26') and the compressed air outlet (17,17'), characterized in that the body is in the form of a valve piston (28,28'), which is sealingly and slidably mounted in the housing (11,11'), and which has a first end portion (34,34') which is arranged to influence the check valve (30,30'), and a second end portion (55,55') which is arranged to influence the shut-off valve (48, 52;48',52'), whereby the valve piston (28,28') is arranged to be moved in a first direction, bringing both valves (30,30' and 48,52;48',52'respectively) to their second positions when a pressure impulse occurs in the low-pressure fluid inlet (14,14') and to be moved in the opposite direction, bringing both valves (30,30' and 48,52;48',52' respectively) to their first positions when no pressure impulse occurs in the low-pressure fluid inlet (14,14').

2. A booster according to claim 1, characterized in that the shut-off valve comprises a valve body (48,48') which is axially movable in the housing and which is arranged to abut against a valve seat (52,52') of the housing (11,11'), thereby preventing a communication between the compressed air inlet (16, 16') and the third cylinder space (26,26'), and the valve piston's (28,28') second end portion (55,55') is arranged to come into abutment against the valve body (48,48') and move it away from the seat (52,52'), thereby providing such a communication when the valve piston (28,28') is moved in the first direction.

3. A booster according to claim 2, characterized in that the shut-off valve is a plate valve, where the valve body (48) comprises a valve plate (50) which is supported by a stem (49) with a through-going, second passage (56) via which the third cylinder space (26) can communicate with the compressed air outlet (17), the valve piston's (28) second end portion (55) being arranged to close the second passage (56) while at the same time the valve piston (28) brings the valve body (48) away from its seat (52).

4. A booster according to claim 3, characterized in that the valve piston (28) is mounted in and extends coaxially with the main piston (22).

5. A booster according to claim 2, characterized in that in the valve piston (28') there is provided an axial passage (56') which extends from the end of the valve piston which is arranged to abut against the valve body (48') and leads into an annulus (78) which is bounded by a central portion of the valve piston (28') and the housing (11'), and which communicates with the air outlet (17').

* * * * *

UNITED STATES PATENT AND TRADEMARK OFFICE
CERTIFICATE OF CORRECTION

PATENT NO.   : 6,679,056 B2
DATED        : January 20, 2004
INVENTOR(S)  : Lucien Lénérand et al.

It is certified that error appears in the above-identified patent and that said Letters Patent is hereby corrected as shown below:

Column 7,
Line 40, delete "a pressure gas, such as," and "especially.".

Signed and Sealed this

Seventeenth Day of August, 2004

JON W. DUDAS
*Acting Director of the United States Patent and Trademark Office*